INVENTOR.
HAROLD E. FOY
BY
FOWLER, KNOBBE
& MARTENS
ATTORNEYS.

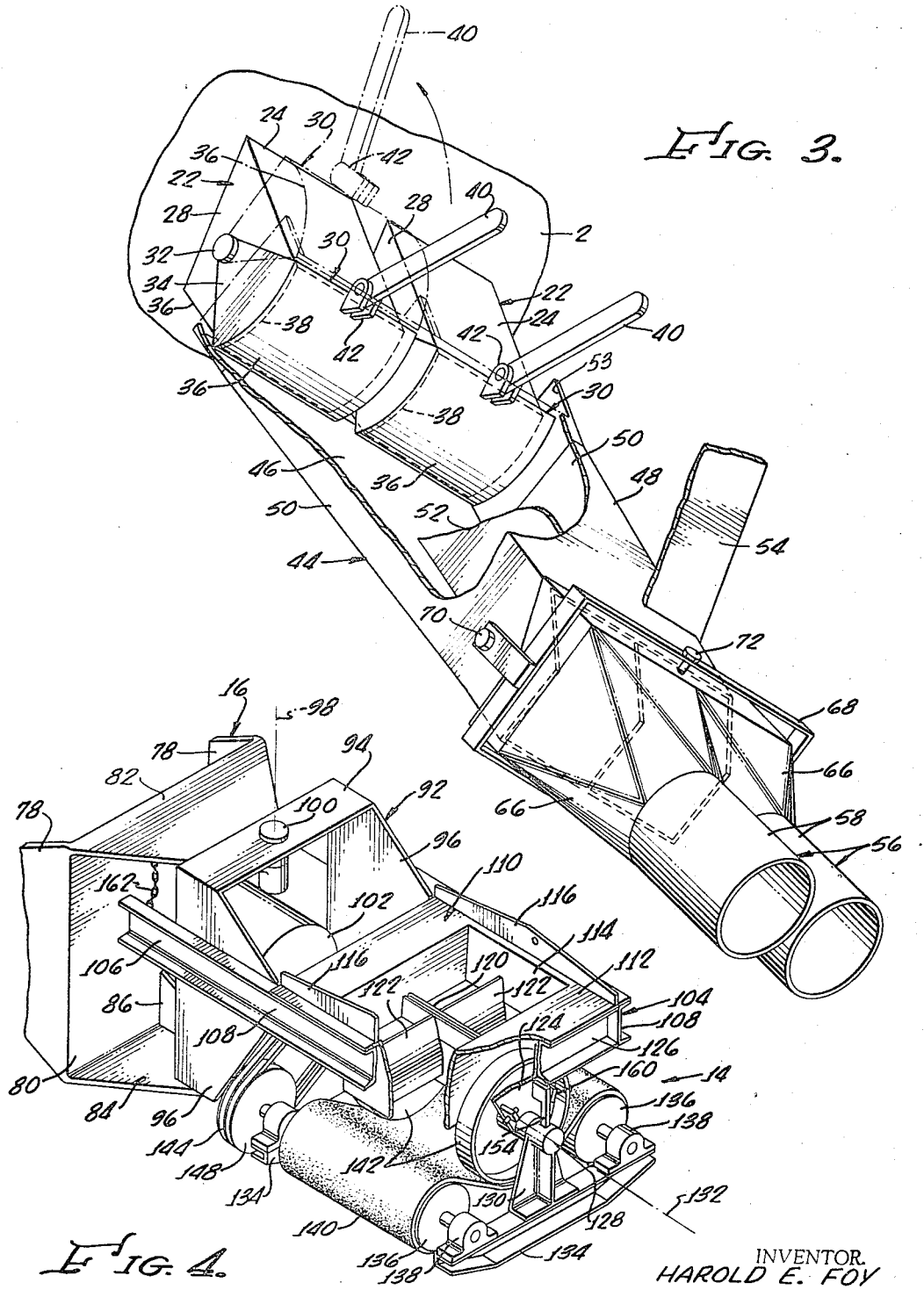

INVENTOR.
HAROLD E. FOY
BY FOWLER, KNOBBE & MARTENS
ATTORNEYS.

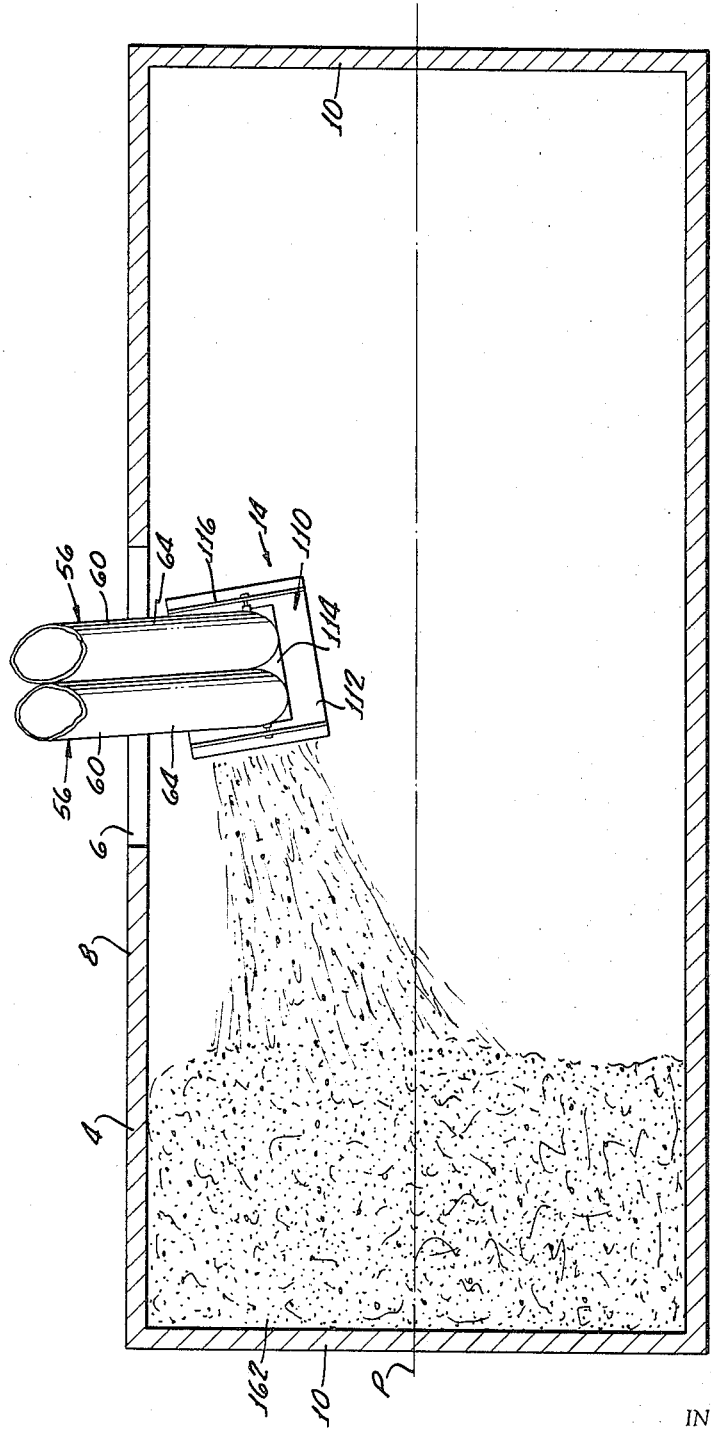

3,342,300
CAR LOADER
Harold E. Foy, Carlsbad, N. Mex., assignor to United States Borax & Chemical Corporation, Los Angeles, Calif., a corporation of Nevada
Filed Nov. 17, 1966, Ser. No. 595,127
11 Claims. (Cl. 198—6)

This invention relates to devices for loading materials in railroad cars, and, more particularly, to devices for delivering frangible materials of a dust producing nature from an elevated hopper alongside a railroad track into a car on the track.

The economics of loading frangible materials from an elevated hopper into a railroad car are very closely tied to the loading rate. Therefore, anything which increases the loading rate without greatly increasing the capital or operating costs of the loading equipment, is a significant development. In the past, many devices have been developed for high speed loading but most have not been adapted to the peculiar problems of loading materials of a very dusty nature, and particularly fertilizer ingredients such as muriate of potash. A satisfactory loading device for such materials must be operable without any personnel interior of the box car during the loading operation. Moreover, swivel joints and other parts which sometimes "freeze" when moisture combines with the dusty fertilizer materials to produce a corrosive condition should be located exterior of the car to the extent feasible.

The problem of a suitable high speed loading apparatus becomes even more complex when the materials are being loaded from an elevated hopper through an opening in the side of the car at about its longitudinal center. A reversible slinger conveyor has been used to throw the materials in either direction toward the ends of the car. However, if the slinger conveyor is positioned midway between the car sides so as to get balanced loading, the angle of inclination of the chute which extends from the hopper through the side opening of the car, and to the slinger conveyor is severely limited.

Prior art devices such as that disclosed in Patent No. 2,879,880 have used a steeply inclined chute from the hopper feeding a horizontal chute which delivers to the slinger conveyor in the center of the car. That device permits a good angle on the inclined chute, but the horizontal chute limits the loading rate even if it includes a screw conveyor as in the patent. It is now desired to load even faster than the rates which have been achieved with that patented loader in order to further reduce loading costs.

In accordance with this invention, the chute leading from the hopper is inclined very steeply, and yet the horizontal chute at the lower end of the inclined chute is eliminated. This is accomplished by positioning the slinger conveyor just inside the side opening of the railroad car rather than extending it all the way into the center of the car. The slinger conveyor is mounted for pivotal movement about a vertical axis to aim the materials towards the central portion of either end wall. The reactive force of the operating conveyor is sufficient to pivot the slinger conveyor to the appropriate position in accordance with the direction of conveyor travel.

In accordance with this aspect of the invention, the slinger conveyor is mounted on a frame for pivotal movement about a vertical axis and is adapted to be extended interior of the box car through the side opening with the conveyor disposed between the open side and the longitudinal center plane of the car. First stop means limit pivotal movement of the conveyor in one direction to a first position in which the conveyor and the longitudinal center plane of the car converge toward one end, and second stop means limit horizontal pivotal movement of the slinger conveyor in the other direction to a second position in which the conveyor and the longitudinal center plane of the car converge towards the opposite end. A motor selectively drives the slinger conveyor in either of two opposite directions at a velocity sufficient that the reactive force pivots the conveyor to the first position when the conveyor is driven toward said one end and to the second position when the conveyor is driven toward the opposite end.

Another limiting factor in the angle of inclination of the chute is the amount of head room required over the conveyor. If the chute must terminate a substantial distance above the conveyor, the angle at which the chute can be inclined and still pass through the opening is reduced. Thus, for example, Patent No. 2,879,880 which has a selectively actuated diverter disposed between the end of the horizontal chute and the slinger conveyor to direct the frangible materials onto one end or the other of the slinger conveyor, requires that the outlet of the chute be substantially above the slinger conveyor. In addition, problems are encountered with the use of a diverter interior of the box car as the diverting mechanism tends to freeze under the dusty conditions. These problems have been reduced in the loader constructed in accordance with this invention by the use of a pair of side-by-side chutes which deposit material on opposite ends of the slinger conveyor. Gates at the upper end of the two chutes permit either of the chutes to be selectively opened or closed in accordance with which direction the slinger conveyor is operating. The gates are thus exterior of the car, thereby reducing the head room required directly over the slinger conveyor and also removing the selector from the area which is subject to freezing.

In accordance with this aspect of the invention, the apparatus includes first and second side-by-side elongate inclined chutes, the upper ends of which are in communication with the hopper, and the lower ends of which are positionable interior of the box car. A reversible slinger conveyor is disposed at the lower end of the chutes for throwing material from the chutes towards opposite ends of the box car. The chutes are arranged so that one chute deposits materials at one location on the conveyor preferred for throwing the material in one direction, and the other chute deposits material at a different location on the conveyor preferred for throwing material in the opposite direction. Gate means located exterior of the box car alternately open one of the chutes and close the other to deposit the materials at the selected location on the conveyor.

Thus, the two features discussed above, i.e., the use of twin chutes, and the reactive orientation of the slinger conveyor, in combination greatly increase the angle of inclination which can be achieved with the loading chutes, thereby greatly increasing the loading rate of the apparatus. Moreover, each of the two features individually has advantages in increasing the loading rate. These and other features and advantages of this invention will be apparent from the following detailed description when read with reference to the accompanying drawings, in which:

FIG. 3 is an enlarged partial perspective view of the upper portion of the chutes of the apparatus of FIG. 1 showing the connection to the hopper;

FIG. 4 is an enlarged partial perspective view of the slinger conveyor and the frame on which it is mounted with portions cut away for clarity;

Figure 1:
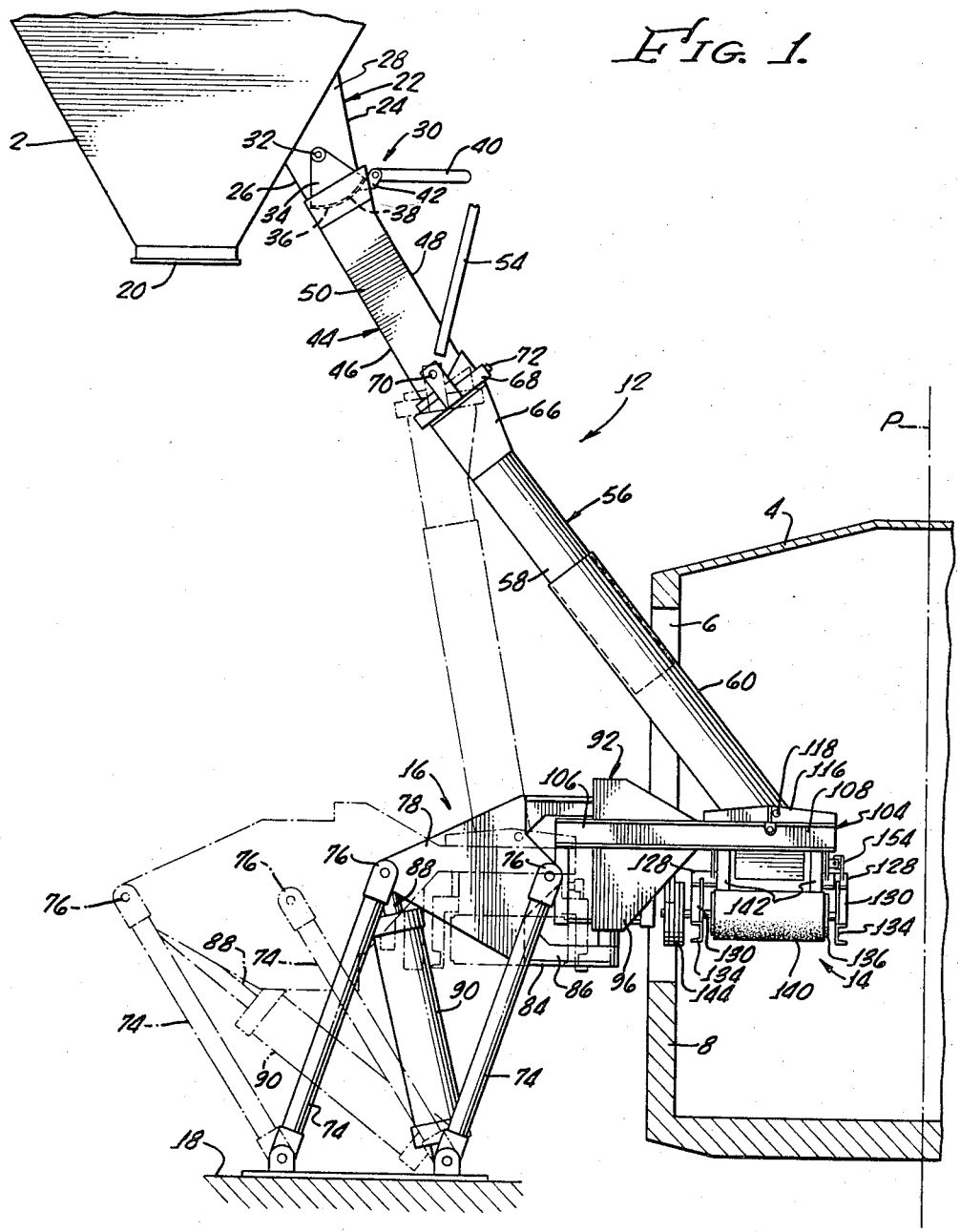
FIG. 1 is a side elevation view showing a loading apparatus connected to an elevated hopper and in position to load a railroad car which is shown in section.

Referring to FIG. 1, an elevated hopper 2 filled with dusty frangible materials such as muriate of potash is disposed above and alongside a railroad car 4 standing on railroad tracks, not shown. The car 4 has an opening 6 through the upper part of its one side wall 8 about midway between its ends 10 (see FIG. 7). Chute means 12 extend downwardly from the hopper 2 through the opening 6 and terminate over a slinger conveyor 14 positioned just inside the car 4 between the sidewall 8 and the upright longitudinal center plane P of the car. The slinger conveyor 14 can be moved into and out of the opening by a carriage 16 mounted on a dock 18.

Figure 2:
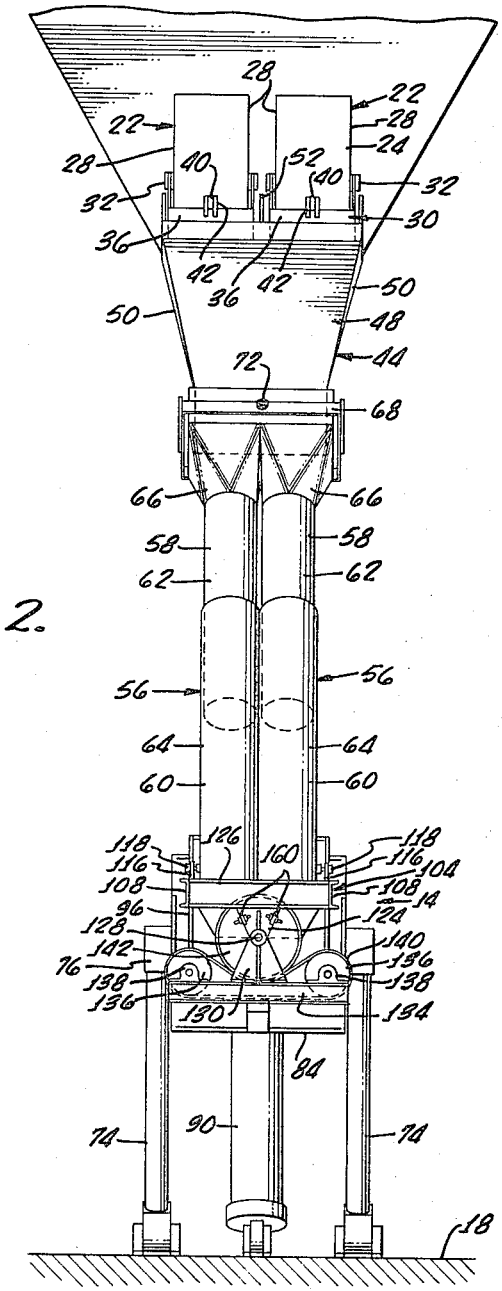
FIG. 2 is a front elevation view of the loading apparatus of FIG. 1.

Referring now to FIGS. 1–3, the lower portion of the elevated hopper 2 is of frusto-conical shape terminating in a conventional closed outlet 20. A pair of side-by-side spouts 22 on one side of the hopper are directed toward the car. Each spout 22 includes converging front 24 and rear 26 walls and a pair of side walls 28. A gate 30 is pivotally mounted on each spout 22 by trunnions 32 extending from the sides 28 of the spouts 22. Each gate 30 has a pair of side members 34 pivoted on the trunnions 32 and a curved lower plate 36 for sealing the opening of the spout. The bottom edges 38 of the spout sides 28 are curved to conform to the curvature of the sealing plate 36. An operating handle 40 attached to the sealing plate 36 by mounting brackets 42 is used to move the gate 30 from the solid line position of FIG. 3 to the phantom position of FIG. 3 to open the spout outlet. A spout extension 44 is disposed in communication with the spout openings and has a rear wall 46, a front wall 48 and two converging side walls 50. A partition 52 extending between the front 48 and back 46 walls of the extension member divides it into two separate passageways, one for each spout. The upper portion of the extension front wall is cut away at 53 to permit free passage of the gates 30 in opening and closing. The rear wall 46 of the extension is fixed to the spouts 22, e.g., by welding, and a brace 54 connected between the extension and the hopper rigidifies the structure.

Two side-by-side chutes 56, each in communication with a different one of the two passageways, extend from the lower outlet of the spout extension 44 downward through the opening 6 in the box car. Each chute 56 includes an upper member 58 and a lower member 60 having respective cylindrical portions 62 and 64 the upper 62 of which is received in the lower 64 in telescoping relationship. The upper member 58 of each chute terminates at its upper end in a transition portion 66 which is rectangular at the inlet and circular at the outlet. The rectangular inlet circumscribes the spout extension outlets and is suspended therefrom by a circumscribing frame 68 which is pivotally connected to the extension 44 and the upper chute member 58 by two pairs of aligned pins 70 and 72, each pair being perpendicular to the other. By that interconnection, the chutes are pivotable about two mutually perpendicular axes relative to the hopper 2.

Referring now to FIGS. 1, 2, 4 and 6, the carriage 16 is supported on four parallel arms 74 each of which is pivotally mounted at its lower end on the dock 18, and at its upper end 76 on the side plates 78 of the carriage. A structural end plate 80 affixed to the side plates 78 supports upper 82 and lower 84 triangular mounting plates which extend forwardly from the end plate 80 and are braced by an upright reinforcing member 86. The carriage 16 can be moved toward and away from the railroad car 4 by extending and retracting the piston rod 88 of a hydraulic system 90 connected to the carriage and dock diagonally across the parallel arms 74.

A frame supporting member 92 including upper 94 and lower plates and a pair of side plates 96 is mounted for pivotal movement about a vertical axis 98 on the triangular carriage mounting plates 82 and 84 by a pair of swivel joints 100. An electric motor 102 is suitably mounted interior of the frame supporting member 92. A rectangular channel frame 104 is supported from the side plates 96 by rear extensions 106 of the side channels 108 which are rigidly connected to the side plates 96. A flow directing device 110 which is mounted interior of the frame 104 includes a flat top plate 112 affixed on the frame and having a large rectangular opening 114 through which the materials fed from the chutes pass. A pair of upstanding brackets 116 on opposite sides of the opening have pins 118 extending therethrough and into the lower ends of the chutes to pivotally connect the chutes in position so that the flow from the chutes passes into the opening 114. A partition wall 120 divides the opening into two halves, one for receiving material from each of the chutes. Curved baffles 122 in each of the opening portions turn the frangible materials which come out of the chutes in an inclined direction of flow to drop vertically through the opening 114.

Figure 5:
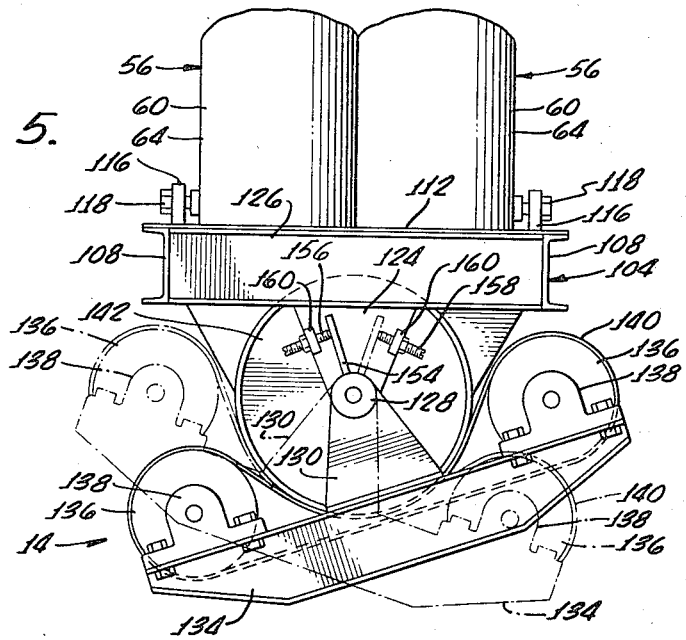
FIG. 5 is an enlarged front elevation view of the slinger conveyor showing the pivoting of the conveyor about a horizontal axis.

As is shown most clearly in FIGS. 4 and 5, a pair of triangular brackets 124 extending downwardly from the forward 126 and rear channel members of the frame 104 each has a spindle 128 at its lower end on which conveyor support brackets 130 are mounted for pivotal movement about a horizontal axis 132. A conveyor mounting beam 134 is affixed on each of the brackets 130 and a pair of conveyor drive rollers 136 are mounted in journals 138 at opposite ends of the beams 134. A conveyor belt 140 travels around the rollers 136 and its upper portion is guided to a concave shape by a circular disc 142 rotatably mounted on the bracket 130. Each of the conveyor rollers 136 is driven by belts 144 extending from drive pulleys 146 on the electric motor around pulleys 148 and 150 connected to the rollers 136. The rotational axis 152 of the drive pulleys 146 is aligned with the horizontal pivotal axis 132 of the slinger conveyor 14 so that as the slinger conveyor pivots about its horizontal axis the tension in the belts 144 is not changed.

An arm 154 extending upwardly from the front conveyor support bracket 130 strikes left 156 and right 158 stops attached to the bracket 124 in the two extreme pivoted positions of the slinger conveyor 14 to limit pivotal movement of the slinger conveyor about the horizontal axis 132. The amount of pivoting can be adjusted by moving the threaded stop bolts 156 and 158 in the threaded stop lugs 160.

Figure 6:
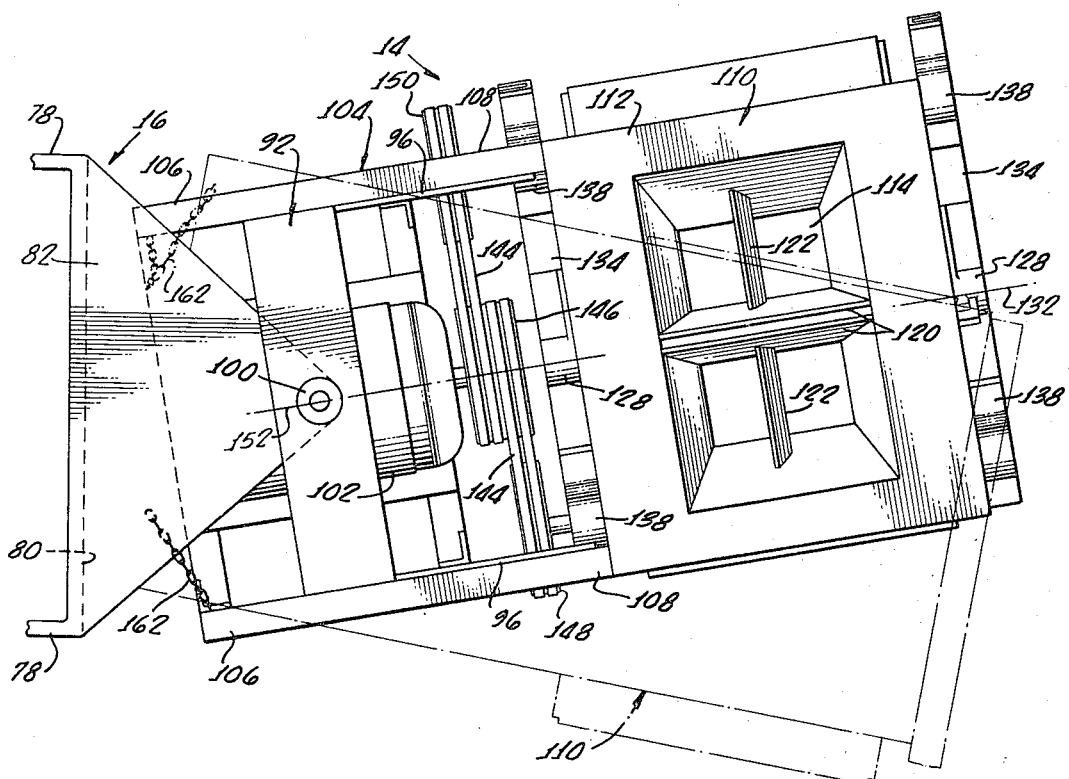
FIG. 6 is an enlarged partial plan view of the slinger conveyor showing the pivotal movement of the conveyor about a vertical axis; and, FIG. 7 is a plan view showing the slinger conveyor loading one end of a railroad car.

Referring to FIGS. 4 and 6, the amount of pivoting of the slinger conveyor about the vertical axis 98 is limited by a pair of chains 162 interconnected between the side channels 108 of the frame 104 and the upper triangular mounting plate 82 of the carriage. The extreme pivotal positions of the slinger conveyor may be adjusted by shortening or lengthening the chains 162, or attaching the chains by different ones of its links.

In operation, a car 4 is positioned alongside the dock 18 and the hydraulic piston 90 is actuated to swing the slinger conveyor 14 into the loading position between the side wall 8 and the center plane P as shown in FIG. 7 and in full lines in FIG. 1. As the slinger conveyor 14 moves into the box car, the telescopic joint of the telescoped chutes is extended. When it is desired to begin loading, one of the gates 30 is manually opened to supply materials through one of the chutes and the motor 102 is energized to rotate the slinger conveyor 14. The selection of the gate 30 to open is manually coordinated with the direction of rotation of the motor so that the material is fed on the rear portion of the travelling belt 140. For example, if in FIG. 5 the slinger conveyor is to be driven to throw materials to the left, the gate 30 for the righthand chute is opened to deposit materials adjacent the right or rear roller 136.

The reactive force of the conveyor driving to the left and throwing materials, pivots the slinger conveyor about its horizontal axis 132 to the solid line position shown in FIG. 5, and also pivots it about its vertical axis 98 to the solid line position of FIGS. 6 and 7. In this position, the materials are thrown at a slight inclination to the horizontal and also in a direction generally towards the center of the end wall 10 to which they are directed.

When the one end of the car is full, the driving motor 102 is reversed so that the slinger conveyor travels to the right in FIG. 5. The left gate 30 is opened manually and the right gate 30 is closed. The reactive force then being applied in the opposite direction pivots the slinger conveyor to the phantom position shown in FIGS. 5 and 6 so that the materials now being thrown to the right are still thrown at a slight inclination to the horizontal and toward the center portion of the end wall 10 at which they are directed.

When the second end of the car is loaded, the hydraulic cylinder 90 is actuated to extend the piston rod 88 and move the slinger conveyor and chute out of the car to the phantom position of FIG. 1. The chutes telescope as they move out of the car.

Thus, the slinger conveyor is positioned just inside the box car to maximize the angle of inclination of the feeding chute consistent with the small opening in the car, but the materials are thrown in a direction diverging from the adjacent wall 8 or converging toward the longitudinal center plane P so that the load 162 spills away from the loading position towards both sides about equally and the load is balanced. The conveyor is automatically pivoted to the appropriate position for directing the materials towards the desired position responsive to rotation of the conveyor in either direction.

While the invention has been described with reference to a particular preferred embodiment, it should be understood that the embodiment is only exemplary and the invention should be limited only in accordance with the following claims.

I claim:

1. Apparatus for loading frangible materials in a railroad car having an upright longitudinal center plane through the center of its opposite end walls, and an opening through one side wall, said loading apparatus comprising:
    a slinger conveyor;
    means mounting the slinger conveyor for pivotal movement about a vertical axis;
    means for extending the slinger conveyor interior of the car through the side opening so that the slinger conveyor is disposed between the open side and the longitudinal center plane;
    first stop means limiting pivotal movement of the slinger conveyor in one direction to a first position in which the conveyor and the longitudinal center plane converge toward one end of the car;
    second stop means limiting pivotal movement of the slinger conveyor in the other direction to a second position in which the conveyor and the longitudinal center plane of the car converge toward the opposite end; and,
    means for selectively driving the slinger conveyor in either of two opposite directions at a velocity sufficient that the reactive force pivots the conveyor to the first position when the conveyor is driven toward said one end and to the second position when the conveyor is driven toward said opposite end.

2. Apparatus for loading frangible materials in a car in accordance with claim 1, and further comprising:
    means mounting the slinger conveyor for pivotal movement about a horizontal axis;
    stop means for limiting pivotal movement of the conveyor about the horizontal axis between two oppositely inclined positions so that the conveyor inclines downward in the direction of said one end responsive to driving the conveyor toward said one end and inclines downward in the opposite direction responsive to driving the conveyor toward said opposite end.

3. Apparatus for loading frangible materials in a car in accordance with claim 1, wherein:
    the slinger conveyor is mounted on a frame;
    the means mounting the slinger conveyor for pivotal movement about a vertical axis includes vertical pin means exterior of the car pivotally connecting the frame to the extending means; and,
    the first and second stop means are elongate flexible connectors each connected at one end to said frame and at their other end to said extending means.

4. Apparatus for loading frangible materials in a car in accordance with claim 3, wherein the effective length of said flexible connectors is adjustable.

5. Apparatus for delivering frangible materials from an elevated hopper to a railroad car having an opening through one side, said apparatus comprising:
    first and second side-by-side elongated inclined chutes, the upper end of each of said chutes being in communication with said hopper;
    means for positioning the lower ends of said chutes interior of the box car;
    a reversible slinger conveyor disposed at the lower end of said chutes for throwing material from the chutes toward opposite ends of the box car, said chutes being arranged so that one chute deposits materials at one location on the conveyor preferred for throwing the material in one direction, and the other chute deposits material at a different location on the conveyor preferred for throwing the material in the opposite direction; and
    gate means exterior of the box car for alternatively opening one of the chutes and closing the other to deposit the materials at the selected location on the conveyor.

6. Apparatus for delivering frangible materials from an elevated hopper to a car in accordance with claim 5, wherein the angle of inclination of the chutes is greater than 45°.

7. Apparatus for delivering frangible materials from an elevated hopper to a car in accordance with claim 6, wherein a curved deflector plate is disposed adjacent the lower end of each chute to direct the materials vertically onto the conveyor.

8. Apparatus for delivering frangible materials from an elevated hopper to a car in accordance with claim 5, wherein the pair of side-by-side chutes each include an upper portion and a lower portion telescopically connected to accommodate movement of the conveyor relative to the hopper.

9. Apparatus for delivering frangible materials from an elevated hopper to a car in accordance with claim 8, wherein a pair of mutually perpendicular pivot pins permit pivoting of the chutes relative to the hopper about two mutually perpendicular axes.

10. A railroad car loader for delivering frangible materials from an elevated hopper to a car comprising:
    a pair of side-by-side steeply inclined chutes having their upper ends in communication with the hopper and their lower ends disposed interior of a car;
    a slinger conveyor disposed beneath the lower ends of the chutes so as to receive materials from one chute near one end of the conveyor and from the other chute near the other end of the conveyor;
    means exterior of the car for alternatively closing the chutes;
    means mounting said conveyor for pivotal movement about a generally vertical axis between a first position in which the conveyor diverges from one wall of the car in one direction and a second position in which the conveyor diverges from said one wall in the opposite direction; and, means for selectively driving the conveyor in either of two directions with sufficient velocity that the reactive force pivots the conveyor to the first position responsive to driving the conveyor in one direction and to the second position responsive to driving the conveyor in the other direction.

11. Apparatus for delivering a dusty frangible material from an elevated hopper disposed alongside a railroad track to a box car on the track, the box car having an opening through one side, said apparatus comprising:

two steeply inclined chutes disposed side-by-side, each having their upper end in communication with an outlet from the hopper;

a pair of gates disposed near the upper ends of the chutes for alternatively closing and opening the chutes to feed material from the hopper through one or the other chute;

means intermediate the length of the chutes permitting each chute to pivot about two mutually perpendicular axes perpendicular to the longitudinal axis of the chutes;

each chute including an upper portion and a lower portion telescopically connected to permit variation of the length of the chutes;

a frame connected to the lower ends of the chutes;

a carriage adapted to move the frame through the opening in the side of the box car from a position with the chutes and the frame disposed exterior of the box car to a position with the lower ends of the chutes disposed just interior of the box car;

means mounting said frame for pivotal movement about a vertical axis on said carriage, said axis being exterior of the car in the loading position;

deflectors mounted on said frame adjacent the lower end of said chutes for deflecting materials flowing from said chutes from the inclined direction of the chutes to a vertical fall;

a slinger conveyor mounted on the frame directly beneath the deflectors for receiving material from the chutes and throwing it toward the ends of the box car, said chutes being disposed relative to the conveyor so that one chute deposits material adjacent one end of the conveyor and the other chute deposits materials toward the other end of the conveyor;

means mounting said slinger conveyor for pivotal movement about a horizontal axis between a first position in which one end of the conveyor is lower than the other, and a second position in which the opposite end of the conveyor is lower than said one end;

flexible means connected between said frame and said carriage restricting piovtal movement of said frame about said vertical axis to a first position in which the slinger conveyor is directed toward the middle portion of one end wall of the box car, and a second position in which the slinger conveyor is directed toward the middle portion of the other end wall of the box car; and, motor means for selectively driving said conveyor in either direction at a sufficient velocity that the reactive force of the travelling conveyor throwing the frangible material positions said frame in said first position and said slinger conveyor in said first position when the conveyor is driven in one direction and pivots said frame and conveyor to said second positions responsive to driving the conveyor in the opposite direction.

References Cited

UNITED STATES PATENTS

| | | | |
|---|---|---|---|
| 672,409 | 4/1901 | Scheidegger | 198—68 X |
| 771,648 | 4/1904 | Lamborn | 198—72 |
| 1,325,602 | 12/1919 | Albright | 198—68 X |
| 2,467,634 | 4/1949 | Sinden | 198—6 |
| 2,879,880 | 3/1959 | McGivney | 198—6 |

FOREIGN PATENTS 149,063　7/1961　Russia.

EVON C. BLUNK, *Primary Examiner.*

R. J. HICKEY, *Assistant Examiner.*